US011067116B2

(12) United States Patent
Sellers

(10) Patent No.: US 11,067,116 B2
(45) Date of Patent: Jul. 20, 2021

(54) LOW TORQUE BALL SOCKET ASSEMBLY

(71) Applicant: Federal-Mogul Motorparts LLC, Southfield, MI (US)

(72) Inventor: Roger Sellers, Arnold, MO (US)

(73) Assignee: Federal-Mogul Motorparts LLC, Southfield, MI (US)

( * ) Notice: Subject to any disclaimer, the term of this patent is extended or adjusted under 35 U.S.C. 154(b) by 361 days.

(21) Appl. No.: 16/126,324

(22) Filed: Sep. 10, 2018

(65) Prior Publication Data
US 2020/0080589 A1 Mar. 12, 2020

(51) Int. Cl.
*F16C 11/06* (2006.01)
*B60G 7/00* (2006.01)

(52) U.S. Cl.
CPC .......... *F16C 11/0614* (2013.01); *B60G 7/005* (2013.01); *F16C 11/068* (2013.01); *F16C 11/0666* (2013.01); *F16C 11/0685* (2013.01); *B60G 2204/416* (2013.01); *B60G 2206/80* (2013.01); *Y10T 403/32631* (2015.01)

(58) Field of Classification Search
CPC .. B60G 7/001; B60G 7/005; B60G 2204/416; B60G 2204/80; B60G 2206/7101; B60G 2206/80; B60G 2206/81012; F16C 11/0604; F16C 11/0614; F16C 11/0623; F16C 11/0633; F16C 11/0642; F16C 11/0657; F16C 11/0666; F16C 11/0676; F16C 11/068; F16C 11/0685; F16C 11/069; F16C 11/0695; F16C 11/08; F16C 33/125; F16C 2208/02; F16C 2326/05; F16C 11/06; Y10T 403/32196; Y10T 403/32204; Y10T 403/32311; Y10T 403/32631; Y10T 403/32696; Y10T 403/32713; Y10T 403/32729; Y10T 403/32737
USPC ...... 403/76, 77, 90, 122, 130, 132, 134, 135
See application file for complete search history.

(56) References Cited

U.S. PATENT DOCUMENTS

| | | | | |
|---|---|---|---|---|
| 3,940,946 A | * | 3/1976 | Andersen | F16D 3/20 464/89 |
| 4,824,418 A | * | 4/1989 | Taubert | F16D 3/185 464/159 |
| 6,729,211 B1 | * | 5/2004 | Snow | B25B 13/481 81/177.75 |
| 7,278,342 B1 | * | 10/2007 | Chang | B25B 23/0028 81/177.75 |
| 7,862,250 B2 | * | 1/2011 | Kuru | F16C 11/068 403/134 |
| 7,966,915 B2 | * | 6/2011 | Chen | B25B 23/0028 81/177.75 |

(Continued)

*Primary Examiner* — Josh Skroupa
(74) *Attorney, Agent, or Firm* — Robert L. Stearns; Dickinson Wright, PLLC

(57) ABSTRACT

The ball socket assembly includes a housing with at least one open end and with an inner surface that surrounds an inner bore which extends along a central axis. The ball socket assembly also includes a ball stud that has a ball portion and a shank portion. The ball portion is disposed in the inner bore of the housing and has an outer diameter which is in a spherical fit relationship with the inner surface of the housing. The shank portion of the ball stud extends out of the inner bore through the at least one open end of the housing. The ball portion is out of contact with any bearings on opposite axial sides of the ball portion such that the ball stud is able to move along the central axis relative to the housing.

18 Claims, 3 Drawing Sheets

(56) References Cited

U.S. PATENT DOCUMENTS

| | | | | |
|---|---|---|---|---|
| 8,246,476 B2* | 8/2012 | Chen | ................... | B25B 13/481 |
| | | | | 464/141 |
| 8,366,339 B2* | 2/2013 | Lin | ................... | F16C 11/0604 |
| | | | | 403/57 |
| 8,956,236 B2* | 2/2015 | Chu | ................... | F16C 11/0604 |
| | | | | 464/159 |
| 9,205,543 B1* | 12/2015 | Chen | ................... | B25B 23/0035 |
| 9,340,082 B2* | 5/2016 | Hintzen | ................ | B60G 7/005 |
| 9,776,310 B2* | 10/2017 | Chen | ................... | B25B 23/0028 |
| 9,903,419 B2* | 2/2018 | Chen | ...................... | F16D 1/108 |
| 10,495,139 B2* | 12/2019 | Nishide | .............. | F16C 11/0633 |
| 2010/0247232 A1* | 9/2010 | Lin | ................... | F16C 11/0604 |
| | | | | 403/76 |
| 2019/0293112 A1* | 9/2019 | Tsai | ................... | F16C 11/069 |

* cited by examiner

LOW TORQUE BALL SOCKET ASSEMBLY

BACKGROUND OF THE INVENTION

1. Field of the Invention

The present invention is related generally to a ball socket assembly, such as for use in a four wheel drive system of a vehicle.

2. Related Art

In some four wheel drive systems, a pair of ball joints fixedly attach an axle with a knuckle. Each of the ball joints has a housing and a ball stud that can articulate and rotate relative to one another. The housing contains a pair of bearings that are disposed on opposite axial sides of a ball portion of the ball stud for allowing this rotation and articulation. In addition to allowing the ball stud to articulate and rotate, the bearings also generally fix the ball stud with the housing in an axial direction. However, in certain circumstances, such as when the ball joint is improperly installed in the vehicle, this limited axial movement of the ball stud relative to the housing can put the ball joint in a bind. This condition may result in a phenomenon typically known as "memory steer" whereby the vehicle wants to keep turning in a direction after completing a turn in the same direction.

SUMMARY OF THE INVENTION AND ADVANTAGES

One aspect of the present invention is related to a ball socket assembly that includes a housing with at least one open end and with an inner surface that surrounds an inner bore which extends along a central axis. The ball socket assembly also includes a ball stud that has a ball portion and a shank portion. The ball portion is disposed in the inner bore of the housing and has an outer diameter which is in a spherical fit relationship with the inner surface of the housing. The shank portion of the ball stud extends out of the inner bore through the at least one open end of the housing. The ball portion is out of contact with any bearings on opposite axial sides of the ball portion such that the ball stud is able to move along the central axis relative to the housing.

The free axial movement of the ball stud relative to the housing advantageously allows the ball socket assembly to be more easily installed in certain applications, such as in the four wheel drive system of a vehicle. Also, the lack of bearings drastically reduces the torque required to articulate or rotate the ball stud. In one example, the elimination of the bearings reduced the torque from 11-13 foot pounds to 24 inch pounds. Also, the lack of bearings reduces the number of components, thus making it more difficult to improperly assemble the ball socket assembly.

According to another aspect of the present invention, a lubricant is disposed in the inner bore and surrounds the ball portion. The lubricant provides some resistance to the axial movement of the ball stud.

According to yet another aspect of the present invention, a dust boot is sealingly engaged with the housing and with the shank portion of the ball stud.

According to still another aspect of the present invention, the at least one open end of the housing is further defined as an open first end and an open second end, the dust boot is sealingly engaged with the housing adjacent the first end, and a cover plate closes the open second end.

According to a further aspect of the present invention, the housing presents a radially inwardly extending lip adjacent the first open end for retaining the ball portion of the ball stud in the open bore.

According to yet a further aspect of the present invention, the ball portion of the ball stud has a truncated surface opposite of the shank portion. The truncated surface allows the ball socket assembly to be made more compactly without compromising the range that ball stud and housing are able to articulate relative to one another.

According to still a further aspect of the present invention, the housing is made as a monolithic piece of metal.

Another aspect of the present invention is related to a method of making a ball socket assembly. The method includes the step of preparing a housing that includes at least one open end and has an inner surface that surrounds an inner bore. The method continues with the step of inserting a ball portion of a ball stud into the inner bore so that a shank portion of the ball stud extends out of the inner bore through the at least one open end. The method proceeds with the step of, without inserting any bearings into the inner bore, locking the ball portion within the inner bore of the housing. The method continues with the step of injecting a lubricant into the inner bore.

According to another aspect of the present invention, the at least one open end of the housing is further defined as an open first end and an open second end, wherein the shank portion of the ball stud extends out of the open first end, and wherein the step of locking the ball portion within the inner bore of the housing is further defined as closing the open second end with a cover plate.

According to yet another aspect of the present invention, the step of closing the open second end with a cover plate is further defined as pressing the cover plate into a groove that is formed into the inner surface of the housing.

According to still another aspect of the present invention, the method further includes the step of sealing a dust boot that is made of an elastomeric material against the

BRIEF DESCRIPTION OF THE DRAWINGS

These and other features and advantages of the invention will become more readily appreciated when considered in connection with the following description of the presently preferred embodiments, appended claims and accompanying drawings, in which:

DESCRIPTION OF THE ENABLING EMBODIMENT

Figure 1:
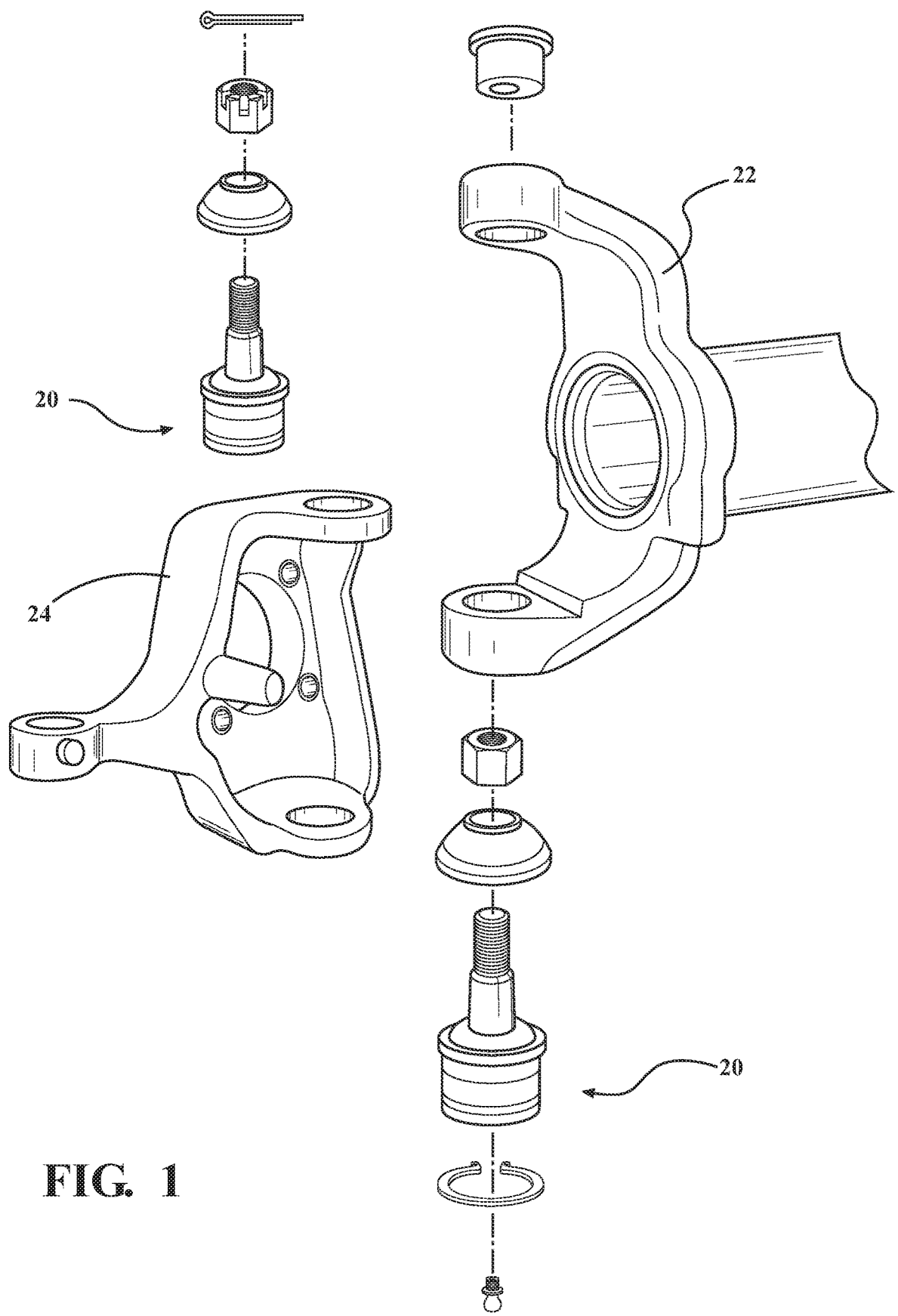
FIG. 1 is a perspective view of a four wheel drive system which includes a pair of ball joints.

Referring to the Figures, wherein like numerals indicate corresponding parts throughout the several views, one aspect of the present invention is related to an improved ball socket assembly 20 (also known as a ball joint). As shown in FIG. 1, in the exemplary embodiment, the ball socket assembly 20 is configured to attach a four wheel drive (4WD) axle 22 with a knuckle 24 in a drivetrain assembly of a vehicle.

Figure 2:
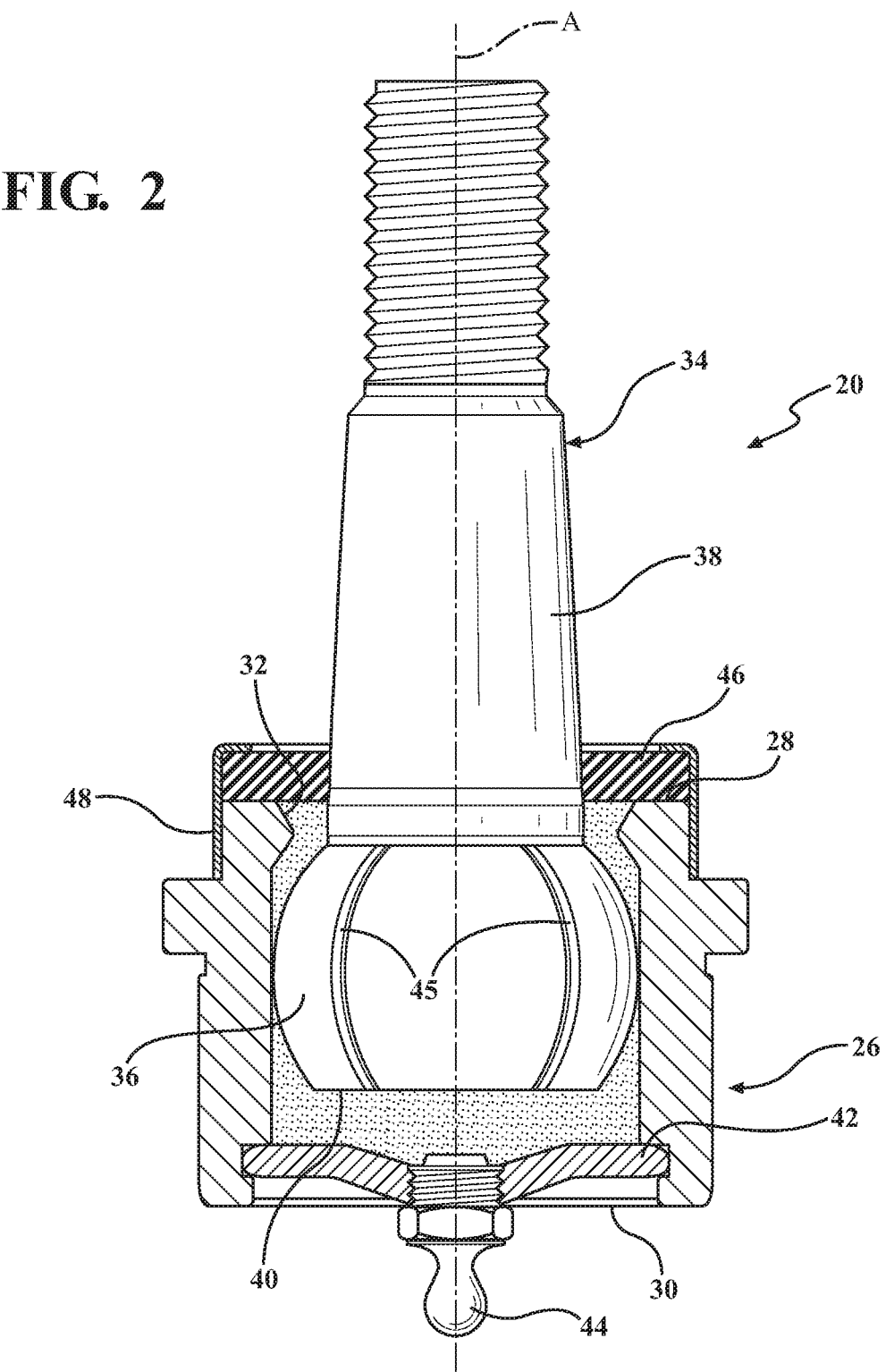
FIG. 2 is a partially cross-sectional view of an exemplary embodiment of a ball joint constructed in accordance with one aspect of the present invention.
Figure 3:
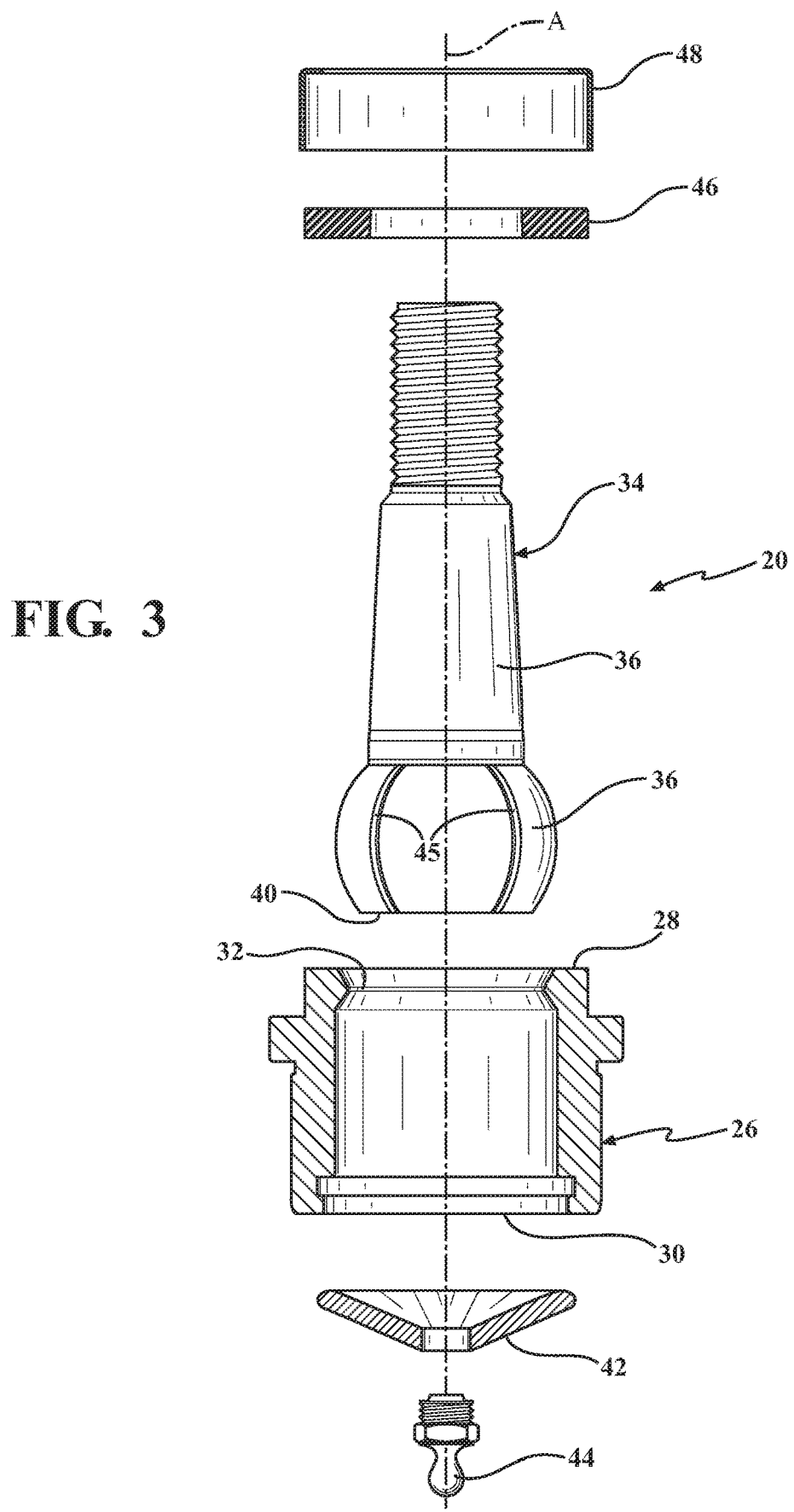
FIG. 3 is an exploded and partially cross-sectional view of the ball joint of FIG. 2.

Referring now to FIGS. 2 and 3, the ball socket assembly 20 includes a housing 26 with an outer surface and an inner surface. The inner surface surrounds an inner bore which extends along a central axis A from an open first end 28 to an open second end 30. Adjacent the first end 28, the housing 26 presents a radially inwardly extending lip 32 with a curved lower surface and a tapered upper surface. Adjacent the second end 30, the inner surface of the housing presents a groove which extends circumferentially around the central axis A. The housing 26 is preferably made of a single, monolithic piece of metal, such as steel or an alloy steel and is preferably shaped through casting or forging process before the inner surface is machined to its final form. In the exemplary embodiment, the housing 26 is of a cartridge-style construction in that it is configured to be pressed into an opening of another component, such as the axle 22 or the knuckle 24. However, it should be appreciated that the housing 26 could alternately be built into another component, such as a tie rod end (not shown).

The ball socket assembly 20 further includes a ball stud 34 that has a ball portion 36 and a shank portion 38. The ball portion 36 is disposed in the inner bore of the housing 26 and has a generally semi-spherically curved outer surface with a truncated bottom surface 40. The shank portion 38 projects out of the inner bore through the open first end 28 of the housing 26 for attachment with another component (such as the axle 22 or knuckle 24). The ball stud 34 is preferably made of a single, monolithic piece of metal, such as steel or an alloy steel and may be shaped through any suitable means, e.g., casting or forging.

A cover plate 42 is disposed in the inner bore and is received in the groove on the inner surface of the housing 26. The cover plate 42 preferably starts with a frustoconical shape and is then flattened to expand it such that it seats in the groove to permanently close the open second end 30 and thereby capture (i.e., lock) the ball portion 36 of the ball stud 34 in the inner bore. The cover plate 42 includes an opening which is configured to receive a Zerk fitting 44 for injecting a lubricant (such as grease) into the inner bore during initial assembly and regular maintenance of the ball socket assembly 20.

A dust boot 46 is disposed at the open first end 28 of the housing 26. The dust boot 46 is sealingly engaged with a top surface of the housing 26 and with the shank portion 38 of the ball stud 34. The dust boot 46 is retained in engagement with the housing 26 via a cup-shaped cap 48 which is press-fit into engagement with the outer surface of the housing 26 and which captures a radially outer end of the dust boot 46 between the cap 48 and the bottom surface of the housing 26. The dust boot 46 is made of an elastomeric material, such as rubber, so that it can elastically flex to maintain the seals with the housing 26 and ball stud 34 as these components articulate and rotate relative to one another.

The ball portion 36 of the ball stud 34 is in a clearance fit relationship with the inner surface of the housing 26. That is, the diameter of the ball portion 36 is slightly smaller than the diameter of the inner bore of the housing 26 such that radial forces can readily be transferred between the ball portion 36 and the housing 26 but the ball portion 36 is able to freely move in the axial direction (i.e., along the central axis A) or rotate within the inner bore. Since there are no bearings in the inner bore on either axial side of the ball portion 36, this movement of the ball portion 36 is only constrained in one direction by the lip 32 at the first end 28 of the housing 26 and in the other direction by the cover plate 42 at the second end 30. The inner bore is packed with grease to both lubricate the contact between the ball portion 36 and the housing 26 and to provide some resistance to the ball stud 34 as it moves axially between the lip 32 and the cover plate 42. The ball portion 36 is preferably provided with one or more lubricant grooves 45 for channeling the grease across the ball portion 36. Depending on the orientation of the ball stud 34 when the ball socket assembly 20 is installed on the vehicle, the contact between the ball portion 36 and the housing 26 may or may not be along the equator of the ball portion 36.

Another aspect of the present invention is related to a method of making a ball socket assembly 20, such as the ball socket assembly 20 discussed above and shown in FIGS. 2 and 3. The method includes the steps of preparing the housing 26 and inserting the ball portion 36 of the ball stud 34 into the inner bore so that the shank portion 38 extends out of the open first end 28 of the housing 26. The method proceeds with the step of, without inserting any bearings into the inner bore, locking the ball portion 36 within the inner bore of the housing 26. The method continues with the step of injecting a lubricant into the inner bore.

Obviously, many modifications and variations of the present invention are possible in light of the above teachings and may be practiced otherwise than as specifically described while within the scope of the appended claims. Additionally, it is to be understood that all features of all claims and all embodiments can be combined with each other as long as they do not contradict each other. It should also be appreciated that directional terms, such as "top" and "upper" are in reference to the orientation of the ball socket assembly in one or more of the drawings and are not intended to require the ball socket assembly to be in any particular orientation.

What is claimed is:

1. A ball socket assembly for a vehicle, comprising:
   a housing configured for attachment with a first component of a four wheel drive system of a vehicle, said housing including at least one open end and having an inner surface that surrounds an inner bore which extends along a central axis;
   a ball stud configured for attachment with a second component of the four wheel drive system, said ball stud having a ball portion and a shank portion;
   said ball portion of said ball stud being disposed in said inner bore of said housing and having an outer diameter which is in a clearance fit relationship with said inner surface of said housing;
   said shank portion of said ball stud extending out of said inner bore through said at least one open end of said housing; and
   said ball portion being out of contact with any bearings on opposite axial sides of said ball portion such that said ball stud is able to move along said central axis relative to said housing and to rotate about said central axis.

2. The ball socket assembly as set forth in claim 1 further including a lubricant disposed in said inner bore and surrounding said ball portion.

3. The ball socket assembly as set forth in claim 1 further including a dust boot sealingly engaged with said housing and with said shank portion of said ball stud.

4. The ball socket assembly as set forth in claim 3 wherein said at least one open end of said housing is further defined as an open first end and an open second end, wherein said dust boot is sealingly engaged with said housing adjacent said open first end, and further including a cover plate closing said open second end of said housing.

5. The ball socket assembly as set forth in claim 4 wherein said housing presents a radially inwardly extending lip adjacent said first open end for retaining said ball portion of said ball stud in said open bore.

6. The four wheel drive system as set forth in claim 4 wherein for each of said ball joint assemblies, said at least one open end of said housing is further defined as an open first end and an open second end, wherein said dust boot is sealingly engaged with said housing adjacent said open first end, and further including a cover plate closing said open second end of said housing.

7. The four wheel drive system as set forth in claim 6 wherein for each of said ball joint assemblies, said housing presents a radially inwardly extending lip adjacent said first open end for retaining said ball portion of said ball stud in said open bore.

8. The ball socket assembly as set forth in claim 1 wherein said ball portion of said ball stud has a truncated surface opposite of said shank portion.

9. The ball socket assembly as set forth in claim 1 wherein said housing is made as a monolithic piece of metal.

10. A method of making a ball socket assembly for a four wheel drive system, comprising the steps of:
preparing a housing that includes at least one open end and has an inner surface that surrounds an inner bore and that is configured for attachment with a first component of the four wheel drive system;
inserting a ball portion of a ball stud into the inner bore so that a shank portion of the ball stud extends out of the inner bore through the at least one open end and so that the ball stud can rotate about a central axis of the ball stud and articulate, the ball stud being configured for attachment with a second component of the four wheel drive system;
without inserting any bearings into the inner bore, locking the ball portion within the inner bore of the housing; and
injecting a lubricant into the inner bore.

11. The method as set forth in claim 10 wherein the at least one open end of the housing is further defined as an open first end and an open second end, wherein the shank portion of the ball stud extends out of the open first end, and wherein the step of locking the ball portion within the inner bore of the housing is further defined as closing the open second end with a cover plate.

12. The method as set forth in claim 11 wherein the step of closing the open second end with a cover plate is further defined as pressing the cover plate into a groove that is formed into the inner surface of the housing.

13. The method as set forth in claim 10 further including the step of sealing a dust boot that is made of an elastomeric material against the housing and the shank portion of the ball stud.

14. A four wheel drive system of a vehicle, comprising:
a knuckle and an axle;
a pair of ball joint assemblies attaching said knuckle with said axle;
each of said ball joint assemblies comprising;
a housing including at least one open end and having an inner surface that surrounds an inner bore which extends along a central axis,
a ball stud, said ball stud having a ball portion and a shank portion,
said ball portion of said ball stud being disposed in said inner bore of said housing and having an outer diameter which is in a clearance fit relationship with said inner surface of said housing,
said shank portion of said ball stud extending out of said inner bore through said at least one open end of said housing, and
said ball portion being out of contact with any bearings on opposite axial sides of said ball portion such that said ball stud is able to move along said central axis relative to said housing.

15. The four wheel drive system as set forth in claim 14 wherein each of said ball joint assemblies includes a lubricant disposed in said inner bore and surrounding said ball portion of each of said ball joints.

16. The four wheel drive system as set forth in claim 14 wherein each of said ball joint assemblies includes dust boot sealingly engaged with said housing and with said shank portion of said ball stud.

17. The four wheel drive system as set forth in claim 14 wherein for each of said ball joint assemblies, said ball portion of said ball stud has a truncated surface opposite of said shank portion.

18. The four wheel drive system as set forth in claim 14 wherein for each of said ball joint assemblies, said housing is made as a monolithic piece of metal.

* * * * *